US010730523B2

(12) United States Patent
Demain et al.

(10) Patent No.: US 10,730,523 B2
(45) Date of Patent: Aug. 4, 2020

(54) VEHICLE DRIVE DEVICE AND METHOD OF CONTROLLING VEHICLE DRIVE DEVICE

(71) Applicant: AISIN AW CO., LTD., Anjo-shi, Aichi-ken (JP)

(72) Inventors: Quentin Demain, Anjo (JP); Mitsuru Takahashi, Hekinan (JP); Hiromitsu Kuboyama, Nishio (JP)

(73) Assignee: AISIN AW CO., LTD., Anjo-shi, Aichi (JP)

( * ) Notice: Subject to any disclaimer, the term of this patent is extended or adjusted under 35 U.S.C. 154(b) by 263 days.

(21) Appl. No.: 15/748,707

(22) PCT Filed: Sep. 30, 2016

(86) PCT No.: PCT/JP2016/079185
§ 371 (c)(1),
(2) Date: Jan. 30, 2018

(87) PCT Pub. No.: WO2017/057764
PCT Pub. Date: Apr. 6, 2017

(65) Prior Publication Data
US 2019/0092334 A1    Mar. 28, 2019

(30) Foreign Application Priority Data
Sep. 30, 2015 (JP) ................................ 2015-194000

(51) Int. Cl.
*F16H 63/34* (2006.01)
*B60W 30/192* (2012.01)
(Continued)

(52) U.S. Cl.
CPC .......... *B60W 30/192* (2013.01); *B60W 10/04* (2013.01); *B60W 10/06* (2013.01);
(Continued)

(58) Field of Classification Search
None
See application file for complete search history.

(56) References Cited

U.S. PATENT DOCUMENTS 8,591,381 B2 * 11/2013 Zhang ................... B60W 10/06
477/150
2009/0143193 A1 * 6/2009 Ohshima ............. F16H 61/0021
477/50
(Continued)

FOREIGN PATENT DOCUMENTS

JP    2002-295657 A    10/2002
JP    2010-151229 A    7/2010
(Continued)

OTHER PUBLICATIONS

International Search Report for PCT/JP2016/079185, dated Dec. 27, 2016.

*Primary Examiner* — Justin Holmes
(74) *Attorney, Agent, or Firm* — Sughrue Mion, PLLC (57) ABSTRACT

A vehicle drive device includes a control portion that is allowed to execute a control mode that controls multiple hydraulic elements to cause a vehicle in a stop state of an engine to start moving. The control mode starts controlling part of the multiple hydraulic elements before the engine is started, by using oil pressure accumulated in an accumulator (S8). The control mode starts controlling the rest of the multiple hydraulic elements by using oil pressure that is provided after the engine is started (S16).

15 Claims, 8 Drawing Sheets

(51) Int. Cl.
*F16H 61/00* (2006.01)
*B60W 10/06* (2006.01)
*B60W 10/11* (2012.01)
*F16H 61/02* (2006.01)
*B60W 10/04* (2006.01)
*F16H 63/48* (2006.01)
*F16H 61/686* (2006.01)
*B60W 10/115* (2012.01)
*B60W 10/196* (2012.01)
*B60W 30/18* (2012.01)
*F16H 63/50* (2006.01)
*F02N 11/08* (2006.01)

(52) U.S. Cl.
CPC ........... *B60W 10/11* (2013.01); *B60W 10/115* (2013.01); *B60W 10/196* (2013.01); *B60W 30/18054* (2013.01); *F16H 61/0025* (2013.01); *F16H 61/02* (2013.01); *F16H 61/686* (2013.01); *F16H 63/3483* (2013.01); *F16H 63/48* (2013.01); *B60W 2710/1083* (2013.01); *B60W 2710/188* (2013.01); *B60Y 2300/18016* (2013.01); *F02N 11/0814* (2013.01); *F16H 63/50* (2013.01); *F16H 2061/0034* (2013.01); *F16H 2312/14* (2013.01); *F16H 2312/20* (2013.01)

(56) References Cited

U.S. PATENT DOCUMENTS

| | | | |
|---|---|---|---|
| 2010/0228451 A1* | 9/2010 | Hosoya | F16H 61/0031 701/51 |
| 2010/0228452 A1* | 9/2010 | Hosoya | F16H 61/0031 701/51 |
| 2010/0236231 A1* | 9/2010 | Miyabe | F16H 61/0031 60/413 |
| 2010/0311538 A1* | 12/2010 | Miyabe | F16H 61/0031 477/2 |
| 2011/0239800 A1* | 10/2011 | Sekii | F16H 61/0213 74/473.1 |
| 2013/0008154 A1* | 1/2013 | Neuner | F16H 61/0021 60/413 |
| 2015/0232102 A1* | 8/2015 | Morino | B60W 30/192 477/167 |

FOREIGN PATENT DOCUMENTS

| | | |
|---|---|---|
| JP | 2014-024449 A | 2/2014 |
| JP | 2014-173705 A | 9/2014 |

\* cited by examiner

|      | C-1 | C-2 | C-3 | C-4 | B-1 | B-2 | F-1 |
|------|-----|-----|-----|-----|-----|-----|-----|
| 1ST  | ○   |     |     |     |     | (○) | ○   |
| 2ND  | ○   |     |     |     | ○   |     |     |
| 3RD  | ○   |     | ○   |     |     |     |     |
| 4TH  | ○   |     |     | ○   |     |     |     |
| 5TH  | ○   | ○   |     |     |     |     |     |
| 6TH  |     | ○   |     | ○   |     |     |     |
| 7TH  |     | ○   | ○   |     |     |     |     |
| 8TH  |     | ○   |     |     | ○   |     |     |
| Rev1 |     |     | ○   |     |     | ○   |     |
| Rev2 |     |     |     | ○   |     | ○   |     |

※ (○): ENGINE BRAKE IN OPERATION

FIG. 8B

VEHICLE DRIVE DEVICE AND METHOD OF CONTROLLING VEHICLE DRIVE DEVICE

CROSS REFERENCE TO RELATED APPLICATIONS

This application is a National Stage of International Application No. PCT/JP2016/079185 filed Sep. 30, 2016, claiming priority based on Japanese Patent Application No. 2015-194000 filed Sep. 30, 2015, the contents of all of which are incorporated herein by reference in their entirety.

TECHNICAL FIELD

The present disclosure relates to a vehicle drive device and a method of controlling a vehicle drive device.

BACKGROUND ART

There are vehicles that stop engine idling, for example, while waiting at traffic lights. When such a vehicle starts moving by terminating idle-stop (also called idle-reduction), a delay occurs in supplying oil pressure based on an oil pressure pump that is driven by an engine. Therefore, the vehicle generally has an accumulator, and oil pressure accumulated in the accumulator is discharged and supplied to, for example, predetermined friction engagement elements when the vehicle starts moving.

A known vehicle control device, such as disclosed in Patent Document 1 is proposed. The vehicle control device restarts an engine that is in idle-stop by outputting an activation command to an accumulator (an oil pressure generator), and then outputting a start command to an engine start device, thereby preventing oil pressure supplied to friction engagement elements from delaying in achieving drive force transmission.

RELATED ART DOCUMENTS

Patent Documents

Patent Document 1: Japanese Patent Application Publication No. 2014-24449 (JP 2014-24449 A)

SUMMARY

Problem to be Solved

The technique of Patent Document 1 activates the accumulator to cause friction engagement elements, such as a forward clutch, to complete ineffective stroke elimination before the engine is restarted, thus enabling a vehicle to start moving quickly and bringing a good feeling to a driver. However, the technique performs the engagement control without consideration of the relationship between an accumulated pressure capacity of the accumulator and an oil pressure capacity that is used when the vehicle starts moving. It is noted that the oil pressure capacity is a scale related to oil amount and oil pressure and is a function of the value of suppliable oil pressure and the time during which the oil pressure is suppliable. On the other hand, the accumulated pressure capacity refers to the oil pressure capacity of the accumulator at a specific point in time. If not only the discharge pressure characteristics and volume of the accumulator, but also necessary control pressure and oil amount for the hydraulic elements to be controlled are known, the oil pressure capacity and the accumulated pressure capacity can be approximated as the oil pressure or volume of the accumulator.

For example, in multi-stage automatic transmissions, when a vehicle that is in D range starts moving at the first forward speed after idle-stop, one forward clutch is the only friction engagement element to be used. Therefore, the accumulated pressure capacity of the accumulator is normally sufficient. However, when a vehicle that is in P range starts moving backward, the accumulated pressure capacity of the accumulator may become insufficient because it is necessary to control oil pressure to release the lock of a parking mechanism (P-release) and also to control multiple friction engagement elements. If there is such a shortage of oil pressure supply from the accumulator, the friction engagement elements are not supplied with oil pressure that is sufficient to achieve engagement and a linear solenoid valve is controlled by a command value that is based on the premise that engagement is achieved. Oil pressure from an oil pressure pump is supplied suddenly in this condition after engine starts, and accordingly the friction engagement elements are engaged suddenly. This sudden engagement may cause a shock to a vehicle.

Means for Solving the Problem

A vehicle drive device according to the present disclosure includes: a speed change mechanism that changes a speed of power from an engine and that transmits the power to a drive wheel; an oil pressure pump that is driven by the engine; an accumulator that accumulates oil pressure; and a control portion that is allowed to execute a control mode that controls multiple hydraulic elements to cause a vehicle in a stop state of the engine to start moving, in which the control mode starts controlling part of the multiple hydraulic elements before the engine is started, by using the oil pressure accumulated in the accumulator, and the control mode starts controlling the rest of the multiple hydraulic elements by using oil pressure that is provided after the engine is started.

Further, the present disclosure is a method of controlling a vehicle drive device to cause a vehicle in a stop state of an engine to start moving, and the method includes: a step of setting, on the basis of a shift operation and a shift speed to be established, at least one of hydraulic element that is controlled when the vehicle starts moving; a first oil pressure control step of controlling, out of the multiple hydraulic elements that are set to be controlled, part of the multiple hydraulic elements that is determined to be controlled by using oil pressure accumulated in an accumulator, by supplying the part of the multiple hydraulic elements with the oil pressure from the accumulator before the engine is started; and a second oil pressure control step of controlling the rest of the multiple hydraulic elements by supplying the rest of the multiple hydraulic elements with oil pressure after the engine is started.

Effects of the Invention

According to the present disclosure, in order to cause the vehicle in the stop state of the engine to start moving, the control for the part of hydraulic elements is started before the engine is started, by using the oil pressure from the accumulator, and the control for the rest of the hydraulic elements is started after the engine is started. This prevents a shortage of the oil pressure supply from the accumulator when the vehicle starts moving and also allows the accumulator to have a compact structure.

PREFERRED EMBODIMENTS

Figure 1:
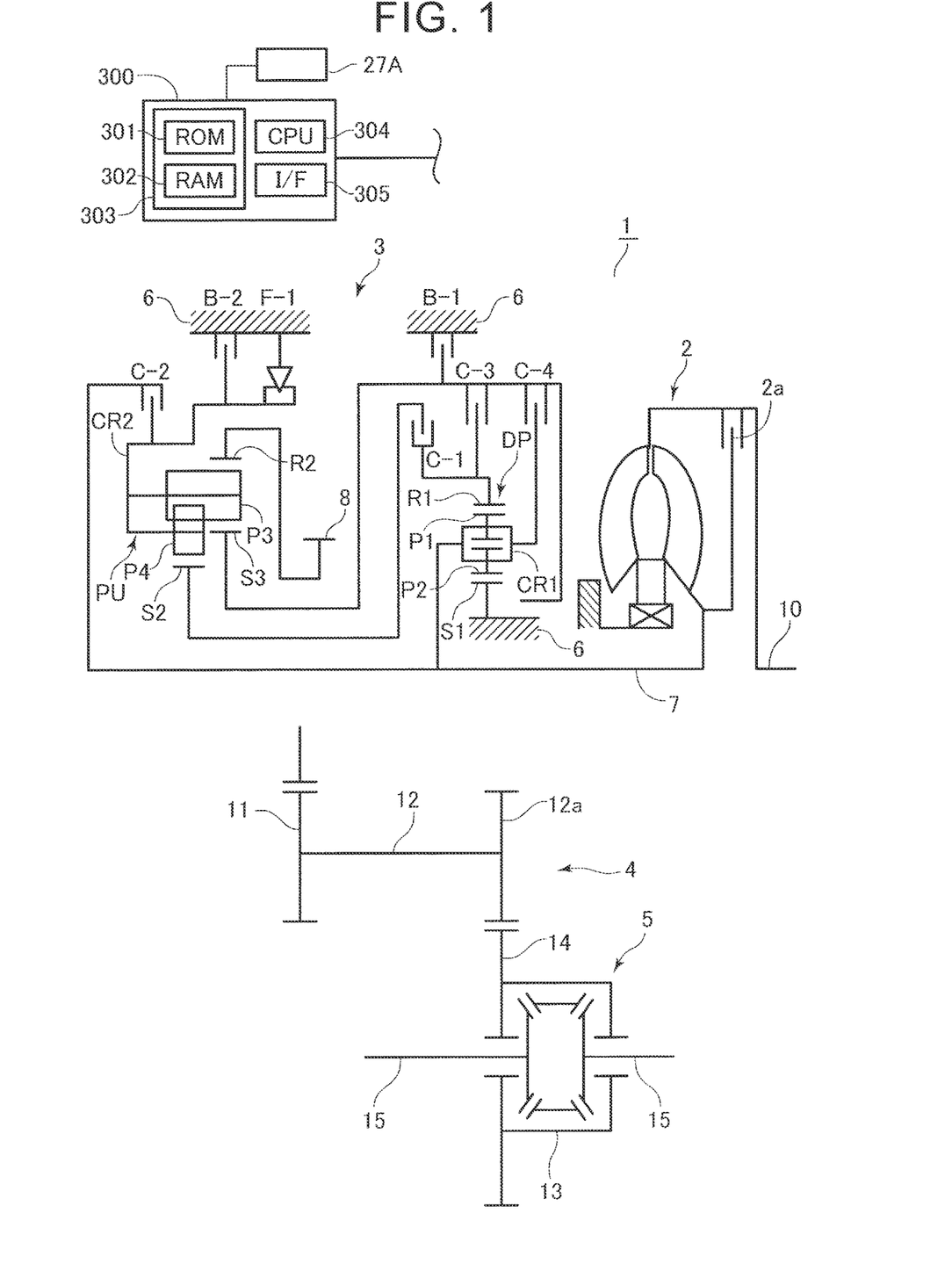
FIG. 1 is a skeleton diagram illustrating an automatic transmission according to a first embodiment.

Below, embodiments are described with reference to the drawings. An automatic transmission 1 is an automatic transmission that is suitable for being mounted on vehicles, such as front engine, front drive (FF) vehicles. The lateral direction in FIG. 1 corresponds to the lateral direction (or the opposite lateral direction) of the automatic transmission 1 that is actually mounted on vehicles. For brevity of description, the right side in FIG. 1 where a drive source, such as an engine, is located is referred to as the "front", and the left side in FIG. 1 is referred to as the "rear".

First Embodiment

First, the schematic structure of the automatic transmission 1 is described with reference to FIG. 1. As illustrated in FIG. 1, in the automatic transmission 1 that is suitable for use in vehicles, such as FF vehicles, a torque converter 2 having a lockup clutch 2a is located at the front; whereas a speed change mechanism 3, a countershaft portion 4, and a differential portion 5 are located at the rear.

The torque converter 2 is concentric with an input shaft 7 of the speed change mechanism 3 that is coincident with an output shaft 10 of an engine (not illustrated) that is an example of a drive source. The speed change mechanism 3 is concentric with the input shaft 7. The countershaft portion 4 is disposed on a countershaft 12 that is parallel to the input shaft 7, and the differential portion 5 has right and left drive shafts 15, 15 that are parallel to the countershaft 12.

The skeleton diagram of FIG. 1 illustrates a plan developed view of the automatic transmission 1, and the input shaft 7, the countershaft 12, and the right and left drive shafts 15, 15 are positioned relative to each other to form a triangle when viewed from the sides.

The speed change mechanism 3 includes a planetary gear (a decelerated rotation output portion) DP and a planetary gear unit (a planetary gear set) PU that are each provided on the input shaft 7. The planetary gear DP is a so-called double-pinion planetary gear and includes a first sun gear S1, a first carrier CR1, and a first ring gear R1. A pinion gear P2 in mesh with the first sun gear S1 and a pinion gear P1 in mesh with the first ring gear R1 are on the first carrier CR1 and mesh with each other.

On the other hand, the planetary gear unit PU is a so-called Ravigneaux type planetary gear and includes four rotating elements, namely, a second sun gear S2, a third sun gear S3, a second carrier CR2, and a second ring gear R2. A short pinion gear P4 in mesh with the second sun gear S2, the third sun gear S3, the short pinion gear P4, and a long pinion gear P3 in mesh with the second ring gear R2 are on the second carrier CR2.

The first sun gear S1 of the planetary gear DP is held stationary with respect to a case 6. The first carrier CR1 is connected to the input shaft 7 so as to have the same rotation as the input shaft 7 (hereinafter referred to as the "input rotation") and is connected also to a fourth clutch C-4. The first sun gear S1 that is stationary and the first carrier CR1 that has the input rotation cause the first ring gear R1 to have decelerated rotation that is decelerated relative to the input rotation. The first carrier CR1 is further connected to a first clutch C-1 and a third clutch C-3.

The sun gear S3 of the planetary gear unit PU is connected to a first brake B-1 and thus is selectively held stationary with respect to the case 6. Further, the sun gear S3 is connected to the fourth clutch C-4 so as to selectively receive the input rotation of the first carrier CR1 via the fourth clutch C-4 and is connected to the third clutch C-3 so as to selectively receive the decelerated rotation of the first ring gear R1 via the third clutch C-3. Further, the second sun gear S2 is connected to a first clutch C-1 so as to selectively receive the decelerated rotation of the first ring gear R1.

In addition, the second carrier CR2 is connected to a second clutch C-2 that receives the rotation of the input shaft 7, so as to selectively receive the input rotation via the second clutch C-2. The second carrier CR2 is connected to a first one-way clutch (an engagement element) F-1 and is prohibited from rotating in one direction with respect to the case 6 via the first one-way clutch F-1. The second carrier CR2 is connected to a second brake (an engagement element) B-2 and is selectively held stationary (engageable) with respect to the case 6 via the second brake B-2. The second ring gear R2 is connected to a counter gear 8.

The counter gear 8 meshes with a counter driven gear 11 that is fixed on the countershaft 12 of the countershaft portion 4. An output gear 12a that is formed on the outer circumferential surface of the countershaft 12 meshes with a gear 14 of the differential portion 5. The gear 14 is fixed to a differential gear 13 and is connected to the right and left drive shafts 15, 15 via the differential gear 13.

Figure 2:
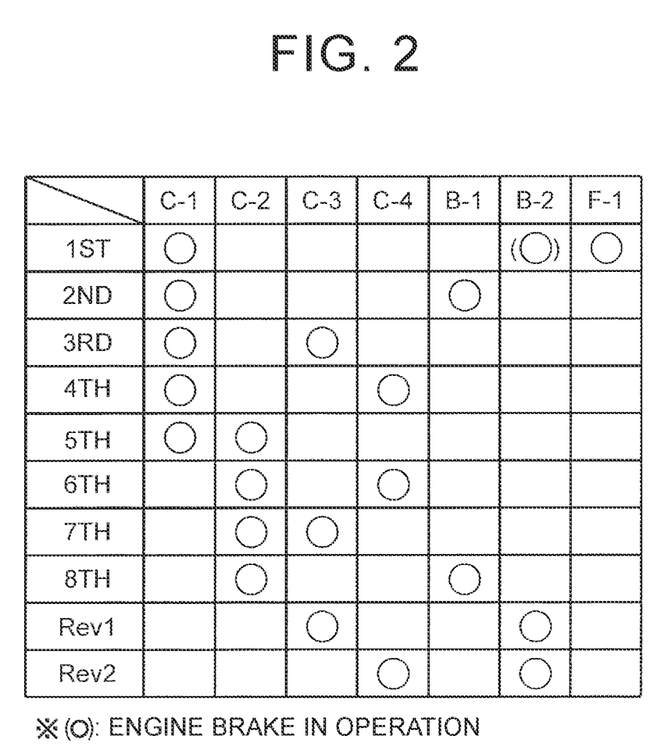
FIG. 2 is an engagement table of the automatic transmission according to the first embodiment.
Figure 3:
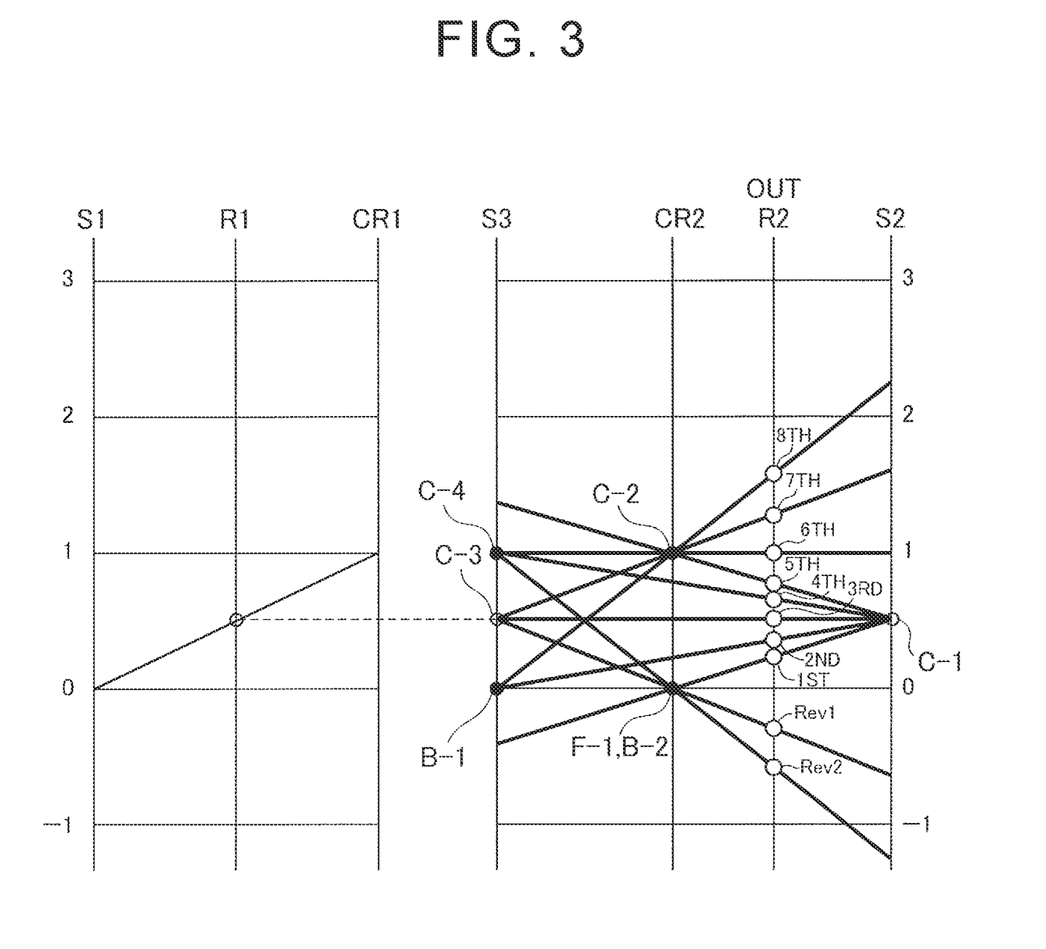
FIG. 3 is a speed diagram of the automatic transmission according to the first embodiment.

In the automatic transmission 1 structured as described above, when the first to fourth clutches C-1 to C-4, the first and second brakes B-1 and B-2, and the first one-way clutch F-1 are engaged and disengaged according to combinations shown in the engagement table of FIG. 2, first (1st) to eighth (8th) forward speeds and first (Rev1) to second (Rev2) reverse speeds are established at rotational speed ratios shown in the speed diagram of FIG. 3. According to the present embodiment, both the first reverse speed and the second reverse speed can be established. Alternatively, the automatic transmission 1 may be designed to use the first reverse speed only without using the second reverse speed.

As illustrated in the speed diagram of FIG. 3, the planetary gear DP makes it possible to output the decelerated rotation that is obtained by decelerating the rotation of the engine. In the planetary gear unit PU, in the case of the first forward speed, the decelerated rotation is input to the second sun gear S2 while the second carrier CR2 is held stationary by engagement of the first one-way clutch F-1, so that the second ring gear R2 outputs rotation corresponding to the first forward speed. In the case of the first reverse speed, the decelerated rotation is inputted to the third sun gear S3 while the second carrier CR2 is held stationary by the second brake B-2, so that the second ring gear R2 outputs rotation corresponding to the first reverse speed.

Figure 4:
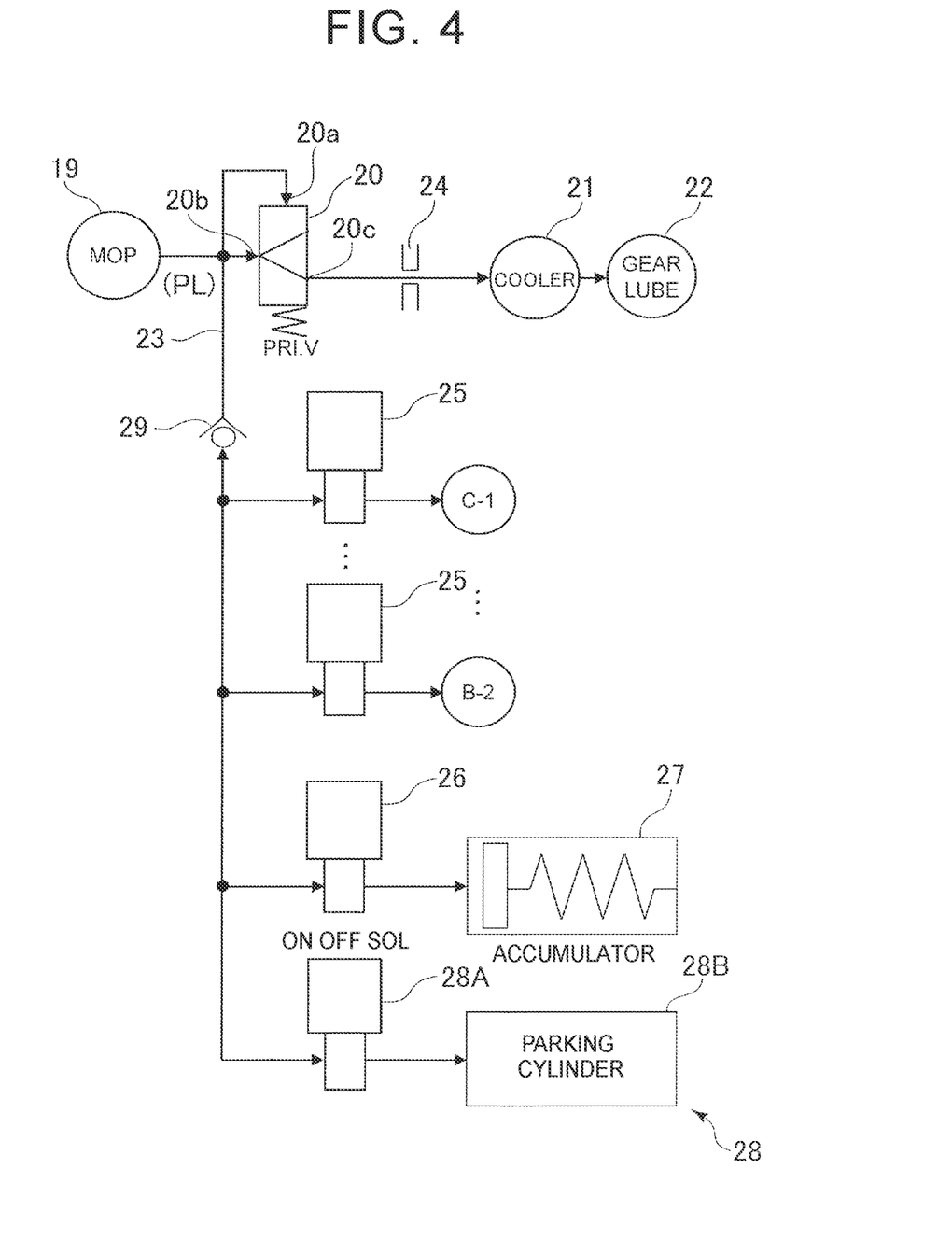
FIG. 4 is a simplified diagram of a hydraulic circuit according to the first embodiment.
Figure 5:
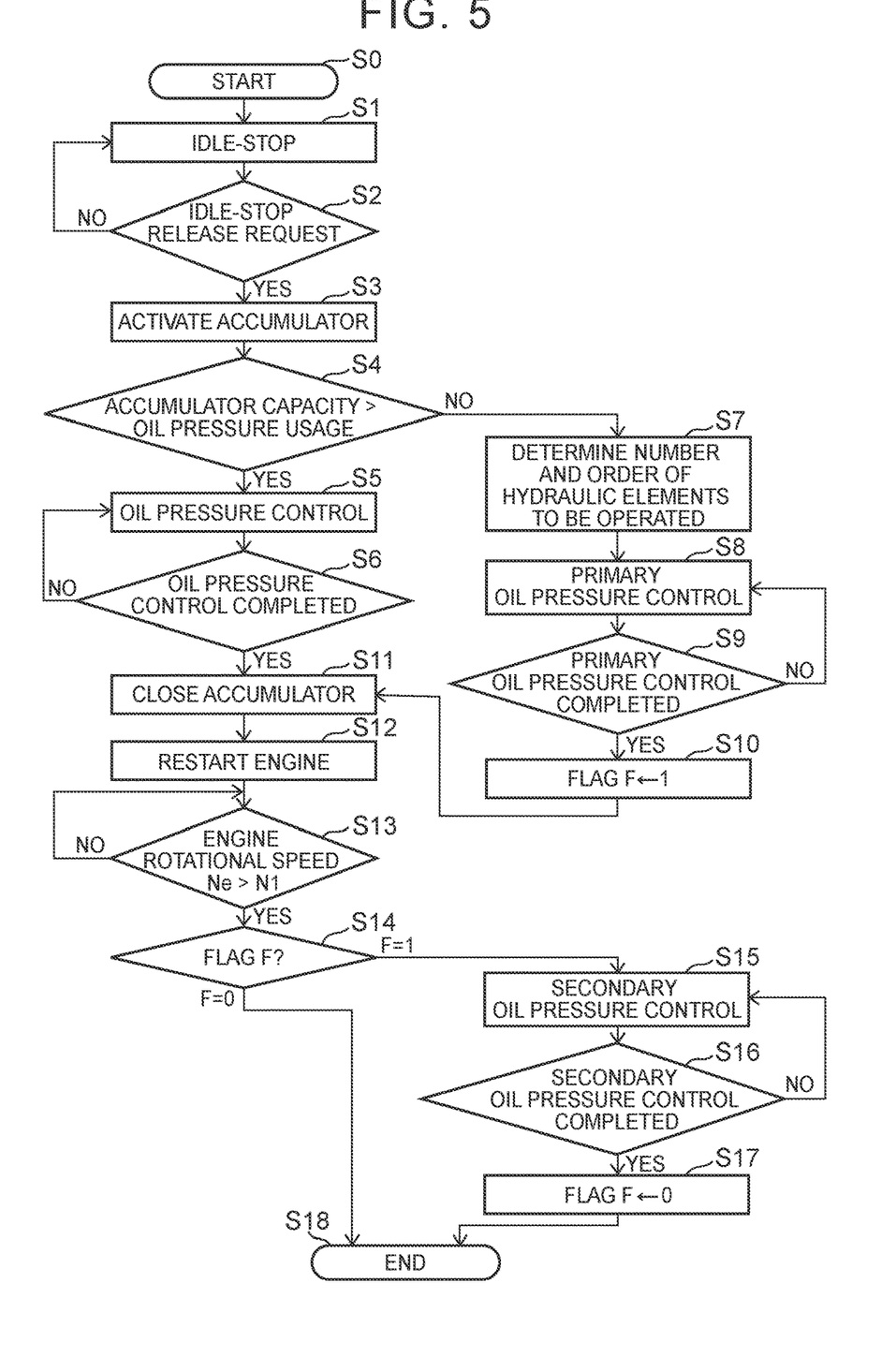
FIG. 5 is a flow chart according to the first embodiment, illustrating how a vehicle that is in idle-stop starts moving.
Figure 6:
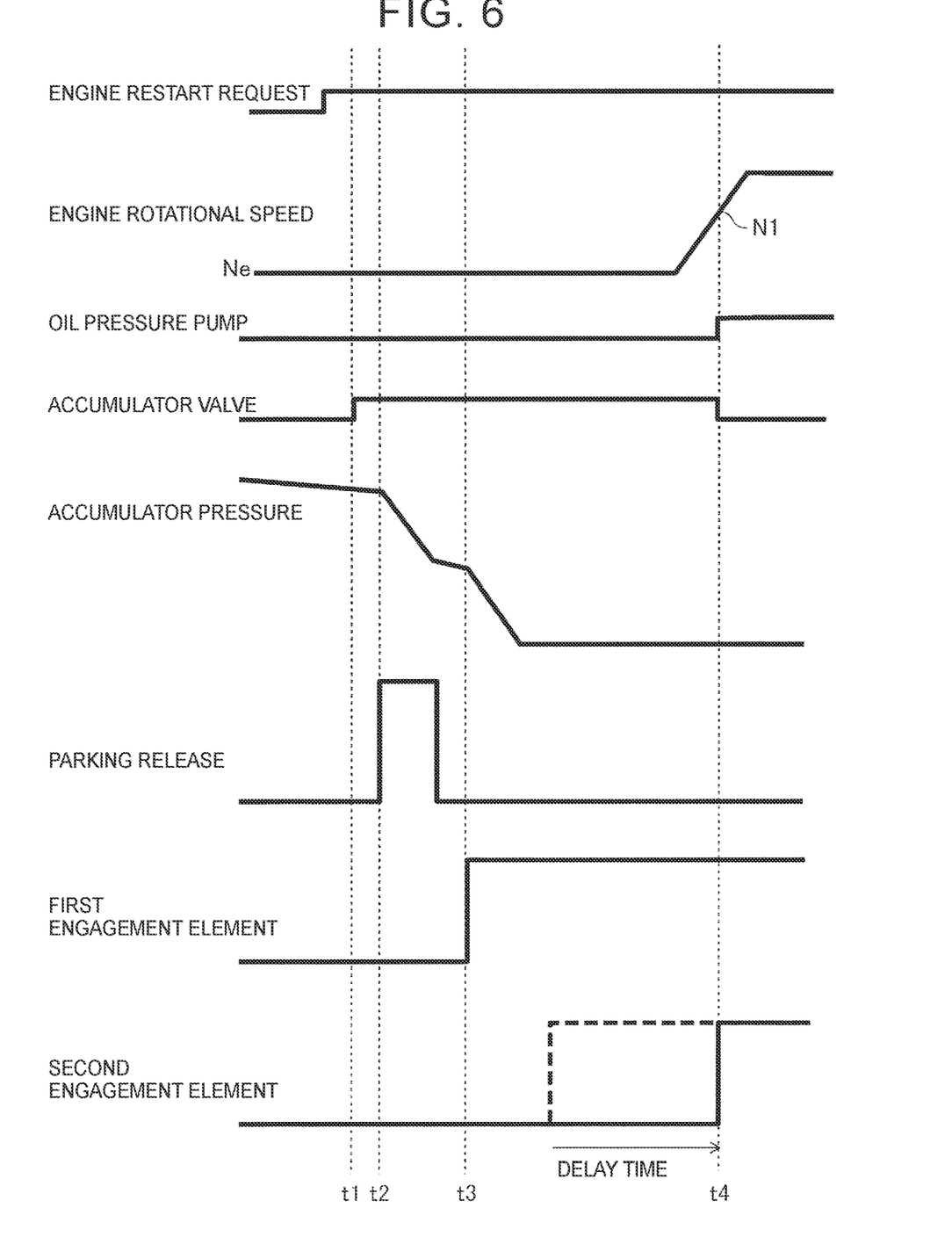
FIG. 6 is a timing chart according to the first embodiment.

Next, with reference to FIG. 4 to FIG. 6, a vehicle control device according the present embodiment, specifically, oil pressure control (idle release control) is described. The oil pressure control is performed to restart the engine by releasing idle-stop that stops idling of the engine when the vehicle is not driven, such as when parked, stopped, or waiting at traffic lights. FIG. 4 is a simplified diagram of a hydraulic circuit that includes a primary regulator valve 20 for regulating oil pressure of a mechanical oil pressure pump (MOP) 19 driven by the engine to line pressure PL. In the primary regulator valve 20, oil pressure at an input port 20*b* is regulated to the line pressure PL by feedback pressure exerted on a feedback port 20*a* and throttle pressure from a throttle that is controlled on the basis of an angle by which a non-illustrated accelerator pedal is depressed. Excessive pressure from the input port 20*b* is outputted from a secondary port 20*c*, passes through an orifice, is cooled by an oil cooler 21, and then is supplied as lubricating oil pressure 22 to the gears and other elements of the automatic transmission 1.

Hydraulic servos of the clutches and brakes C-1 to B-2 of the speed change mechanism 3 communicate through respective linear solenoid valves 25 with a line pressure oil passage 23 that is supplied with the line pressure PL. In FIG. 4, the hydraulic servo of the clutch C1 and the hydraulic servo of the brake B-2 are shown as representatives. The other clutches C-2, C-3, and C-4, and the other brake B-1 are omitted in FIG. 4, but communicate in the same manner. An accumulator 27 communicates with the line pressure oil passage 23 through an accumulator valve 26 that is an on-off solenoid valve. In addition, the line pressure oil passage 23 is connected to a hydraulic parking mechanism 28. The parking mechanism 28 has elements mounted to the rotating shaft of the automatic transmission 1, including a parking gear, a parking pawl, a spring, and a parking cylinder 28B. The parking mechanism 28 is structured as a shift-by-wire parking lock device that uses a hydraulic actuator to activate and release a parking lock. The parking pawl engages with the parking gear by being pressed against the parking gear by the biasing force of the spring and disengages from the parking gear by being driven by the parking cylinder 28B that uses the line pressure PL supplied through an on-off solenoid valve 28A. A check valve 29 is interposed in the line pressure oil passage 23 between the primary regulator valve 20 and the hydraulic servos including C-1 so that the check valve 29 limits the flow of oil from the hydraulic servos to the primary regulator valve 20.

Further, as illustrated in FIG. 1, the automatic transmission 1 as a vehicle drive device according to the present embodiment includes a control device 300 for controlling the hydraulic elements (for example, according to the present embodiment, the clutch C-1, the parking mechanism 28, the clutch C-3, the brake B-2, etc.) that are controlled when the vehicle starts moving. The control device 300 includes the following: a memory portion 303 having a ROM 301 that stores control data for controlling each portion and a RAM 302 that temporarily stores data; a control portion (CPU) 304 that controls the vehicle drive device by reading the control data stored in the memory portion 303; and an input/output circuit (UF) 305 that outputs signals to the outside and inputs to the outside. The control device 300 serves as an idling stop control portion for performing the idling stop control and as an idling release control portion for performing the idling release control.

Next, the control according to the present embodiment is described with reference to a flow chart of FIG. 5 and a timing chart of FIG. 6. FIG. 5 is a flow chart illustrating when idle-stop is released, and FIG. 6 is a timing chart illustrating when idle-stop is released. A vehicle stops, for example, to wait at traffic lights, and the engine is in an idle-stop state (S1). In the idle-stop state, the control portion 304 determines whether or not an idle-stop release request occurs (S2). For example, the control portion 304 determines whether the idle-stop release request (an engine restart request) occurs by detecting one or multiple operations indicating the intention of a driver to start driving the vehicle, such as when a driver operates a foot brake pedal so as to release the foot brake pedal under condition that a selector lever is in D range, when a driver shifts the selector lever from P range to any other range, or when a driver operates an accelerator pedal so as to depress the accelerator pedal. If the idle-stop release request does not occur (NO), the control portion 304 continues the idle-stop state; whereas if the idle-stop release request occurs (YES), the control portion 304 operates to restart the engine. If the engine restart request occurs, the control portion 304 sets, on the basis of a shift operation and a shift speed to be established, the hydraulic elements that are controlled when the vehicle starts moving. To cause the vehicle to start moving by restating the engine, the control portion 304 first operates the accumulator valve 26 to an open position (S3, t1).

The control portion 304 then compares an accumulated pressure capacity (internal pressure) of the accumulator 27 with oil pressure usage of the hydraulic elements that are controlled to cause the vehicle to start moving by restating the engine (S4). For example, the control portion 304 determines the present accumulated pressure capacity of the accumulator 27 by detecting charge pressure of the accumulator 27 using an oil pressure sensor 27A (refer to FIG. 1) or the like. The hydraulic elements have respective known capacities corresponding to start conditions, such as whether a driver starts driving at the first speed in the D range, whether a driver starts driving by shifting the selector lever from P range to reverse (R), or whether a driver starts driving at the second speed. Therefore, the oil pressure usage is determined on the basis of the capacities of the hydraulic elements. More specifically, in step S4, the control portion 304 references a control map stored in the memory portion 303 in order to set a threshold value that is set corresponding to the hydraulic elements that are controlled when the vehicle starts moving, and then compares the threshold value with oil pressure of the accumulator 27. When a driver starts driving by releasing the foot brake without shifting from D range, it is necessary only to connect the clutch C-1. In this case, since the energy of oil pressure accumulated in the accumulator is generally larger than the oil pressure usage, the determination results in YES. In this situation, the control portion 304 uses the accumulator 27 as an oil pressure source (S5) so as to engage the clutch C-1 by causing the linear solenoid valve 25 to control oil pressure supplied to the clutch C-1, and then completes the oil pressure control (S6). In steps S5 and S6 described above, the control portion 304 serves as a first oil pressure control portion and executes a control mode (a second control mode) that controls at least one of the hydraulic elements to cause the vehicle in an stop state of the engine to start moving and that starts controlling each of the hydraulic elements to be controlled, before the engine is started, by using the oil pressure from the accumulator 27.

In general, the second control mode controls fewer hydraulic elements than multiple hydraulic elements controlled in a later described first control mode. Thus, the second control mode can be considered to be a control mode that controls fewer hydraulic elements than the multiple hydraulic elements controlled in the first control mode to cause the vehicle in the stop state of the engine to start moving and that starts controlling all the hydraulic elements to be controlled, before the engine is started, by using the oil pressure from the accumulator. In cases where only one hydraulic element is controlled as in the embodiment described above, the second control mode can be considered to be a control mode that controls one hydraulic element to cause the vehicle in the stop state of the engine to start moving and that starts controlling the hydraulic element to be controlled, before the engine is started, by using the oil pressure from the accumulator. However, the number of hydraulic elements controlled in the second control mode is not limited to one. For example, in the case of vehicle drive devices that engage multiple engagement elements, such as clutches or brakes, when the vehicle starts moving forward, multiple hydraulic elements are controlled accordingly.

As already described, the oil pressure capacity and the accumulated pressure capacity can be each approximated on a scale of oil pressure ($gf/cm^2$). For this reason, according to the present embodiment, the oil pressure usage that is a threshold value corresponding to the oil pressure capacity and the accumulated pressure capacity is stored on a scale of oil pressure on the control map. Since there is a linear relationship between oil pressure of the accumulator and the volume of oil in the accumulator, the oil pressure capacity and the accumulated pressure capacity may be approximated on the basis of the volume of oil in the accumulator, instead of oil pressure. In this case, in step S4, the control portion 304 compares the amount of oil (the oil amount) in the accumulator with the threshold value that is set corresponding to the hydraulic elements that are controlled when the vehicle starts moving. In summary, using the oil pressure of the accumulator, using the oil amount in the accumulator, and using a function of the oil pressure and the oil amount are substantially equivalent to each other. Using the oil amount as a reference can mean that the oil pressure is compared. Conversely, using the oil pressure as a reference can mean that the oil amount is compared. Further, using a function of the oil pressure and the oil amount as a reference can mean that the oil pressure or the oil amount is compared.

When the vehicle starts moving by shifting the selector lever from P range to another range, for example, a reverse range, the following hydraulic elements are necessary: parking release where a solenoid valve performs an operation (P-release) to release the lock of the parking mechanism 28 via an electric signal; the clutch C-3 that is a first engagement element; and the brake B-2 that is a second engagement element. In this case, the accumulator capacity is smaller than the oil pressure usage of the hydraulic elements because the capacity of the accumulator 27 is generally limited by installation space in the vehicle. Thus, the comparison in step S4 results in NO, and the number of hydraulic elements to be operated and the order of operations are determined (S7). In the case of the present embodiment, the available number of hydraulic elements operable by the accumulated pressure capacity of the accumulator 27 is determined to be two, and the order of operations is pre-stored in the memory portion 303 and is determined, according to the stored control data, such that the parking release is the first and the clutch C-3 is the second. On the basis of the determination in step S7 and primary oil pressure control in step S8, the control portion 304 outputs the signal (t2) to the solenoid valve used for the parking release, thereby releasing the parking lock. Oil pressure then is supplied to the hydraulic servo of the clutch C-3 that is the first engagement element, so that the clutch C-3 is engaged smoothly (t3). At this time, the accumulator pressure has decreased and may be insufficient to engage the brake B-2 that is the second engagement element. Therefore, the primary oil pressure control is completed when the two hydraulic elements has been operated. As such, in the primary oil pressure control described above, out of multiple hydraulic elements that are set to be controlled when the vehicle starts moving, the control portion 304 starts controlling part of the hydraulic elements that is determined to be controlled by using oil pressure accumulated in the accumulator 27, by supplying the part of the hydraulic elements with the oil pressure from the accumulator 27 before the engine is started. When the primary oil pressure control (S9; YES) is completed, a primary control flag F is set (F=1) (S10). Upon completion of the oil pressure control (S6; YES) in step S6 and completion of the primary oil pressure control (S9; YES), the accumulator valve 26 is closed (S11).

According to the embodiment described above, the accumulator accumulated pressure capacity is obtained by measurement. As a simplified alternative, the accumulator capacity may be set to a predetermined value based on the accumulator size, and the oil pressure usage may be set on the basis of the number of hydraulic elements associated with how the vehicle starts moving. For example, the control portion 304 as a comparing portion may make a YES determination in step S4 if the number of the hydraulic elements is two or less; whereas may make a NO determination in step S4 if the number of the hydraulic elements is three or more. As such, the control portion 304 may determine whether to perform the primary oil pressure control, on the basis of the number of hydraulic elements that are needed when the engine is restarted. In this case, the order of the hydraulic elements is preset so that step S7 of determining the number of hydraulic elements to be operated and the order of operations is omissible. Further, the control portion 304 may selectively execute the first and second control modes on the basis of a shift operation and/or a shift speed to be established. In this case, the memory portion 303 stores data that defines combinations of the shift operation mode and/or the shift speed to be established with the first and second control modes, and the control portion 304 performs control on the basis of the data stored in the memory portion 303. It is noted that the term "selectively" means simply that the first and second control modes are not executed simultaneously and that a control mode other than the first and second control modes may be executed when the vehicle that is in an idle-stop state starts moving. For example, a control mode (a third control mode) may be executed that controls hydraulic elements that are controlled when the vehicle starts moving, by using oil pressure that is provided after the engine is started, without using oil pressure from the accumulator.

Next, the engine is restarted by a starter motor (S12), and an engine rotational speed Ne increases. When the engine rotational speed Ne reaches a predetermined threshold value N1 (S13; YES), the line pressure PL based on the oil pressure pump 19 increases and enters a hydraulic operating state. The primary control flag F is determined in this state. If it is determined that F=0, the start control associated with restarting the engine is completed (S18). If it is determined in step S10 that F=1 (S14), secondary oil pressure control is performed. In the secondary oil pressure control, the brake B-2 that is the second engagement element and that has been supplied with no oil pressure by the primary oil pressure control in step S9 due to a shortage of the oil pressure capacity is supplied with oil pressure resulting from the secondary oil pressure control by the linear solenoid valve 25 (S15) by use of the oil pressure based on the oil pressure pump 19 as original pressure. In summary, in the secondary oil pressure control, out of the multiple hydraulic elements that are controlled when the vehicle starts moving, the control portion 304 supplies, after the engine is started, oil pressure to the rest of the hydraulic elements that has not been controlled by the primary oil pressure control. As such, after a predetermined time delay (t4), the brake B-2 is controlled from the beginning by the secondary oil pressure control that uses the line pressure based on the oil pressure pump 19, thus the brake B-2 is smoothly engaged and a reverse speed is established (S16). After the secondary oil pressure control is completed (S16; YES), the primary control flag F is reset (F=0) (S17), and the start control associated with restarting the engine is completed (S18). As described above, the control portion 304 serves as a second oil pressure control portion that performs the primary oil pressure control in steps S8 and S9 and the secondary oil pressure control in steps S15 and S16. Specifically, the control portion 304 is configured, as the second oil pressure control portion, to control multiple hydraulic elements to cause the vehicle in the stop state of the engine to start moving and to execute a control mode (a first control mode) that starts controlling part of the multiple hydraulic elements before the engine is started, by using oil pressure accumulated in the accumulator 27, and that starts controlling the rest of the multiple hydraulic elements by using oil pressure that is provided after the engine is started. Thus, the vehicle moves backward smoothly when the engine is restarted after idle-stop.

Specifically, the control portion 304 detects the accumulator accumulated pressure capacity using, for example, the oil pressure sensor 27A and determines the present oil pressure capacity of the accumulator 27. By knowing charge pressure with which the accumulator is charged, it is determined how many hydraulic elements are allowed to be supplied with oil pressure. For example, priorities for the shift of the selector lever from P range to reverse (R) range are set as follows: P-release clutch C-3 brake B-2. When the charge amount of the accumulator 27 is large, the P-release and the clutch C-3 are performed by the primary oil pressure control, and the brake B-2 is performed by the secondary oil pressure control. When the charge amount of the accumulator is small, the P-release is performed by the primary oil pressure control, and the clutch C-3 and the brake B-2 are performed by the secondary oil pressure control. When the charge amount of the accumulator is smaller, the P-release, the clutch C-3, and the brake B-2 are all performed by the secondary oil pressure control.

According to the embodiment described above, it is determined in step S7 that the primary oil pressure control is first applied to the parking release and then applied to the clutch C-3 as the first engagement element and that the secondary oil pressure control is applied to the brake B-2 as the second engagement element. However, this order is changeable, and the brake B-2 may be set as the first engagement element, and the clutch C-3 may be set as the second engagement element. In summary, it is possible to set the number and order of the hydraulic elements within the determined accumulator capacity.

The primary oil pressure control and the secondary oil pressure control that are performed, when idle-stop is released, to supply oil pressure to the hydraulic elements are applicable to electric oil pumps.

The above description relates to the restart initiated by the shift from P range to the reverse range. Similarly, when the selector lever is shifted from P range to 2nd position, the same control is performed such that the parking release is first performed and then the clutch C-1 and the brake B-1 are performed, one of which is set as the first engagement element and the other of which is set as the second engagement element. Further, depending on the accumulator capacity, this is applicable in the same manner to cases where the number of engagement elements is only two (e.g., 2nd start, reverse start), by setting one of the engagement elements as the first engagement element for the primary oil pressure control and by setting the other of the engagement elements as the second engagement element for the secondary oil pressure control. Further, the description relates to when a multi-stage automatic transmission is used as automatic transmissions. However, this is applicable in the same manner to a continuously variable transmission (CVT), and these automatic transmissions may include a motor as another drive source to form a vehicle drive device. According to the embodiment described above, shift speeds, especially, the shift speeds used when the vehicle starts moving are established with one or two friction engagement elements (C-1, C-3, C-4, B-2) as hydraulic elements. Alternatively, for example, the shift speeds may be established with three or more friction engagement elements. Further, according to the embodiment described above, the maximum capacity of the accumulator 27 to accumulate oil is greater than the amount of oil needed to release the lock of the parking mechanism 28 and is less than the sum of the amount of oil needed to release the lock of the parking mechanism 28 and the amount of oil needed to engage the first and second engagement elements (e.g., the clutch C-3 and the brake B-2), and the control portion 304 switches the control mode in accordance with how the vehicle starts moving. Alternatively, the capacity of the accumulator 27 may be set small, and the first control mode may be always executed.

Second Embodiment

Figure 7:
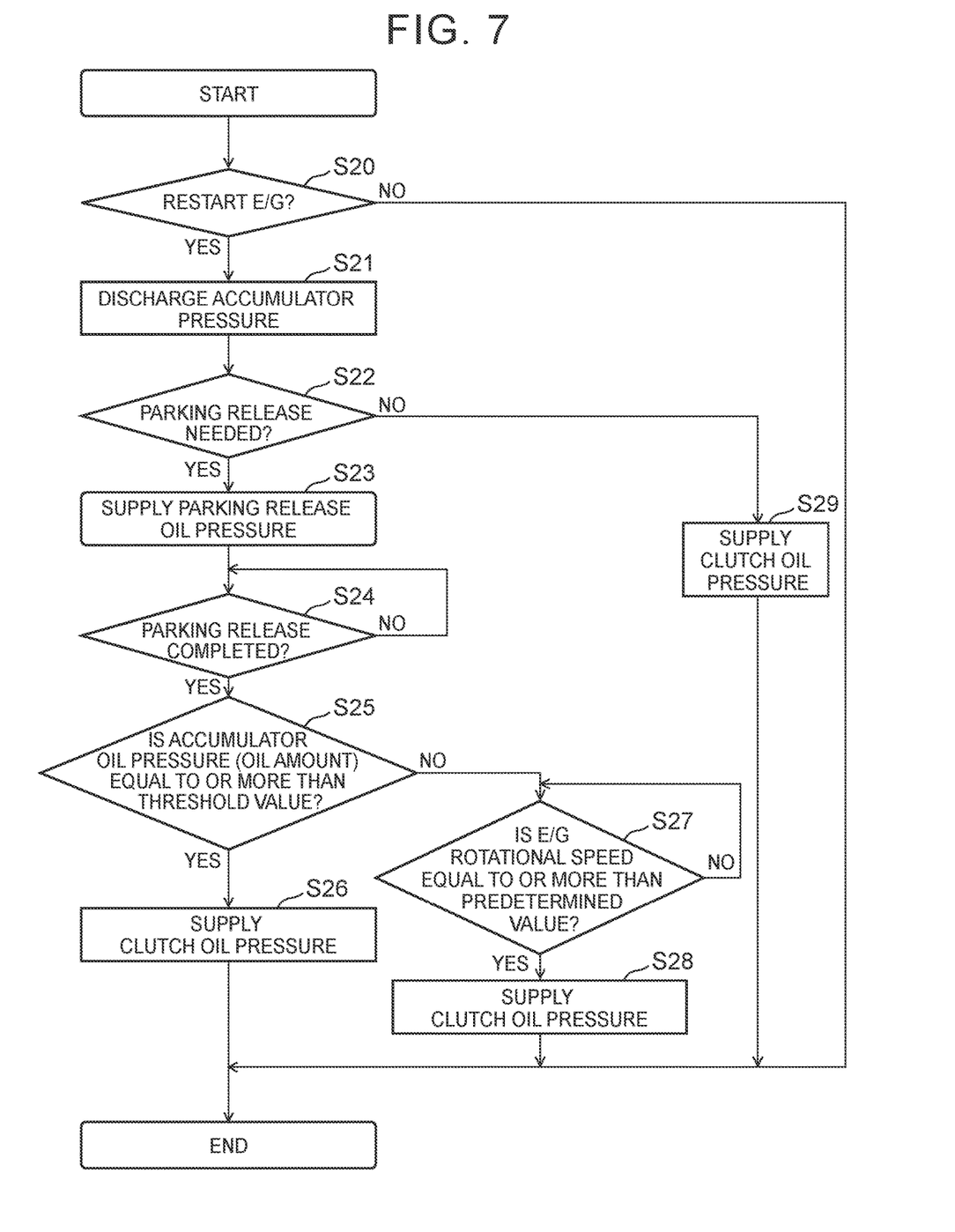
FIG. 7 is a flow chart according to a second embodiment, illustrating how a vehicle that is in idle-stop starts moving.

Next, control according to a second embodiment is described with reference to a flow chart of FIG. 7 and timing charts of FIG. 8A and FIG. 8B. The second embodiment differs from the first embodiment in that whether or not clutch engagement is delayed until after the engine is restarted is determined on the basis of whether or not oil pressure of the accumulator 27 after the lock of the parking mechanism 28 is released is equal to or more than a predetermined value. The description for the same structure of the second embodiment as the first embodiment is omitted.

If an idle-stop release request (an engine restart request) occurs in an idle-stop state (YES in S20 in FIG. 7, a time t5 in FIG. 8A and FIG. 8B), the control portion 304 controls the accumulator valve 26 so as to connect the disconnected accumulator 27 to the line pressure oil passage 23, so that accumulator pressure is discharged (S21). Further, in response to the idle-stop release request, the control portion 304 sets hydraulic elements that need to be controlled when the vehicle starts moving, on the basis of a shift operation and a shift speed to be established.

The control portion 304 outputs an ON signal (an open signal) to the accumulator valve 26 and then determines whether or not there is a need to release the lock of the parking mechanism 28 (hereinafter, referred to also as parking release) (S22). If there is no need to perform the parking release (NO in S22), the control portion 304 increases an oil pressure command value to engage a clutch that is necessary to cause the vehicle to start moving and supplies oil pressure to a hydraulic servo, thereby engaging the clutch (S29). More specifically, according to the present embodiment, when the vehicle starts moving forward, the control portion 304 controls the linear solenoid valve 25 such that oil pressure is supplied to the hydraulic servo of the clutch C-1, and when the vehicle starts moving at the first reverse speed, the control portion 304 controls the linear solenoid valves 25 such that oil pressure is supplied to the hydraulic servos of the clutch C-3 and the brake B-2.

Figure 8A:
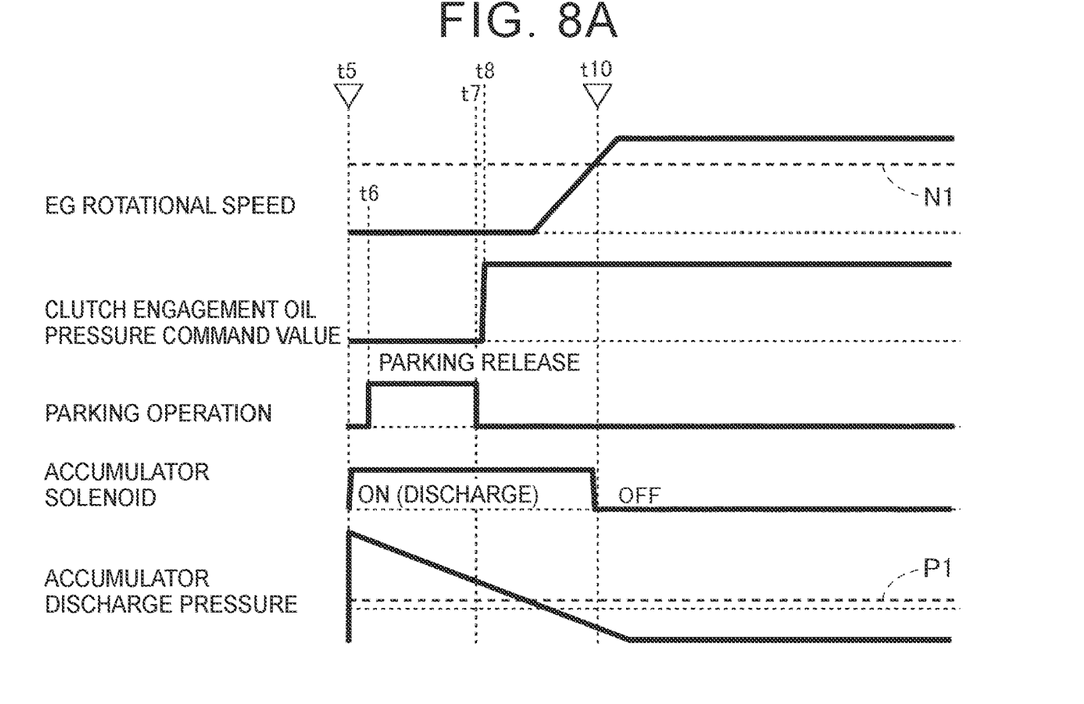
FIG. 8A is a timing chart illustrating when clutch engagement control is performed by accumulator discharge pressure.
Figure 8B:
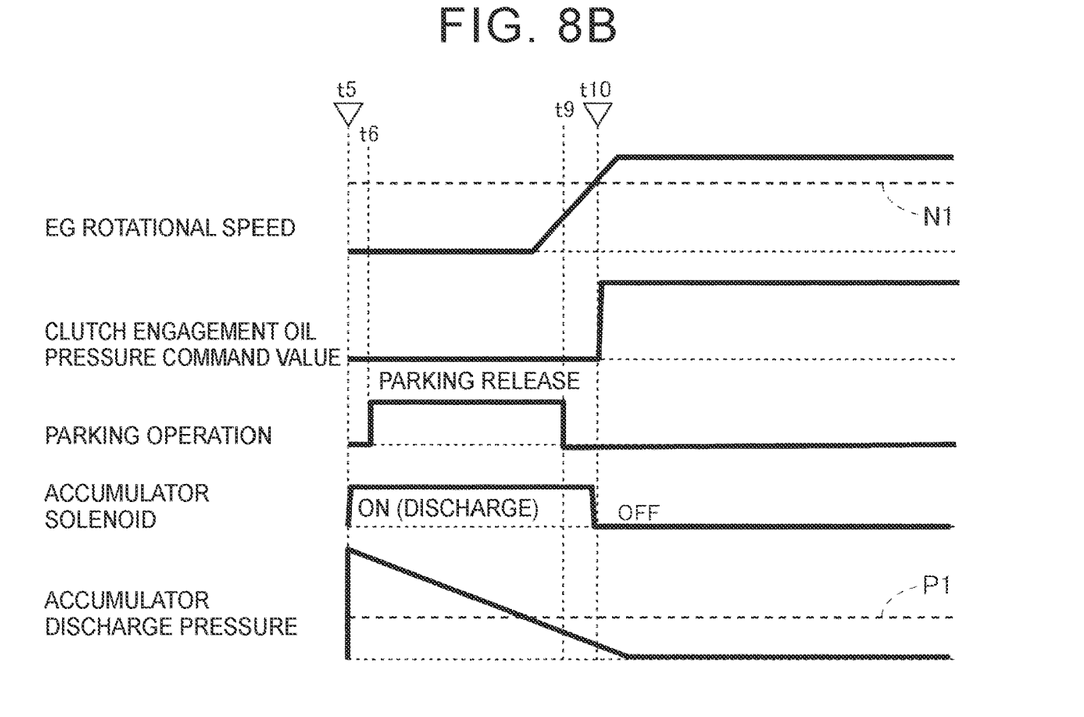
FIG. 8B is a timing chart illustrating when clutch engagement control is performed after engine start.

In contrast, if there is a need to perform the parking release (YES in S22), the control portion 304 supplies oil pressure to the parking cylinder 28B via the on-off solenoid valve 28A (S23, a time t6 in FIGS. 8A and 8B). When the parking release is completed (YES in S24, a time t7 in FIG. 8A and a time t10 in FIG. 8B), the control portion 304 determines, on the basis of a signal from the oil pressure sensor, whether or not the internal pressure of the accumulator 27 is equal to or more than a threshold value (S25). If the internal pressure of the accumulator 27 is equal to or more than a threshold value P1 that is a threshold value to allow starting clutch engagement (YES in S25, the case of FIG. 8A), the control portion 304 supplies, in a manner already described, by using oil pressure from the accumulator 27 before the engine is started, oil pressure to the hydraulic servo of a clutch that is necessary to cause the vehicle to start moving, thereby engaging the clutch (S26, a time t8 in FIG. 8A).

In contrast, if the internal pressure of the accumulator 27 is less than the threshold value P1 because it has taken a long time to complete the parking release due to, for example, the influence of disturbances (NO in S25, a time t9 in FIG. 8B), the control portion 304 delays supplying oil pressure to the hydraulic servo of the clutch that is necessary to cause the vehicle to start moving, until after the engine is started (S27, a time t10 in FIG. 8B). More specifically, the control portion 304 determines that the engine is started, on the basis of the fact that the rotational speed of the engine becomes equal to or greater than a predetermined value (an engine start determination threshold value N1). The control portion 304 waits until the rotational speed of the engine becomes equal to or greater than the predetermined value N1 (NO in S27). On the basis of the fact that the rotational speed of the engine becomes equal to or greater than the predetermined value, the control portion 304 outputs a control signal to the linear solenoid valve 25 (changes the oil pressure command value), thereby supplying oil pressure to the hydraulic servo of the clutch that is necessary to cause the vehicle to start moving. The predetermined threshold value N1 that is a predetermined value of engine rotational speed (a predetermined rotational speed) is a rotational speed that makes it possible to ensure that hydraulic elements (e.g., clutches) are controllable by oil pressure discharged from the mechanical oil pressure pump 19.

As described above, according to the present embodiment, the oil pressure of the accumulator 27 after the parking release is detected by the oil pressure sensor 27A, and if the internal pressure of the accumulator 27 after the parking release is less than the threshold value P1, the start of engagement control of friction engagement elements (e.g., C-1, C-3, C-4, B-2) necessary to cause the vehicle to start moving is delayed until after the engine is started. In summary, multiple hydraulic elements that are controlled when the vehicle starts moving are to be controlled in a predetermined order, and after control of a specific one of the hydraulic elements is performed (according to the present embodiment, after the parking release), it is determined, on the basis of the actual state of the accumulator 27 (according to the present embodiment, the internal pressure), whether or not control of the rest of the hydraulic elements (according to the present embodiment, engagement control of friction engagement elements) is delayed. This makes it possible to perform more accurate vehicle start control. The control portion 304 may determine in step S25 whether or not the accumulated pressure capacity is sufficient, based on the amount of oil in the accumulator 27 instead of the oil pressure of the accumulator 27, in a manner already described. The specific hydraulic element may be different from the parking mechanism 28. For example, the specific hydraulic element may be one of multiple friction engagement elements to be engaged. If a clutch is included that is disposed in a power transmission path between the engine and the speed change mechanism to engage and disengage power transmission between the engine and the speed change mechanism, this clutch may be the specific hydraulic element.

Further, in the automatic transmission 1 according to the second embodiment, for example, when multiple garage operation is performed such that the shift range first changes from the parking range to the drive range, returns to the neutral range once, and then changes back to the drive range again, the lock of the parking mechanism 28 is released by oil pressure from the accumulator 27. If the oil pressure from the accumulator 27 after the lock of the parking mechanism 28 is released is equal to or more than the threshold value P1 that is the threshold value to allow starting clutch engagement, engagement control of engagement elements is started by the oil pressure from the accumulator 27. If the shift range is changed to the neutral range in this situation, the oil pressure supplied from the accumulator to the engagement elements to be controlled (e.g., oil pressure supplied to hydraulic servos to reduce backlash in clutches and brakes) may be discharged once. In this case, the oil pressure of the accumulator 27 may be less than the threshold value P1 as of when the shift range is changed to the drive range again. For this reason, when oil pressure from the accumulator 27 is supplied to engagement elements, such as clutches, after such multiple garage operation is performed, the control portion 304 may always determine whether the oil pressure from the accumulator 27 is equal to or more than the threshold value P1 (i.e., determines whether the oil pressure capacity is equal to or more than the threshold value).

According to the first and second embodiments described above, oil pressure of the accumulator 27 is measured by the oil pressure sensor 27A, but this is not restrictive; thus, estimated oil pressure of the accumulator 27 that has been estimated on the basis of line pressure and oil temperature may be used as the oil pressure of the accumulator 27. For example, the control portion 304 may perform separate estimation calculations to estimate the oil pressure in different states of the accumulator 27, namely, a charge state where the accumulator 27 is charged with oil, a retaining state where oil is retained in the accumulator 27, and a discharge state where oil is discharged from the accumulator 27.

More specifically, in the charge state, the control portion 304 may have a charge-period increasing-pressure gradient value that is a gradient of increasing pressure corresponding to oil with which the accumulator is charged per unit time, and may perform the estimation calculation in the charge state based on the charge-period increasing-pressure gradient value and an elapsed time of the charge state. In the retaining state, the control portion 304 may have a retaining-period decreasing-pressure gradient value that is a gradient of decreasing pressure corresponding to oil leaked from the accumulator 27 per unit time, and may perform the estimation calculation in the retaining state based on the retaining-period decreasing-pressure gradient value and an elapsed time of the retaining state. In the discharge state, the control portion 304 may have a discharge-period decreasing-pressure gradient value that is a gradient of decreasing pressure corresponding to oil discharged from the accumulator 27 per unit time, and may perform the estimation calculation in the discharge state based on the discharge-period decreasing-pressure gradient value and an elapsed time of the discharge state. Preferably, the charge-period increasing-pressure gradient value may be determined on the basis of oil temperature and/or line pressure, and each of the retaining-period decreasing-pressure gradient value and the discharge-period decreasing-pressure gradient value may be determined on the basis of oil temperature.

Below, the embodiments of the present invention are described. It is noted that reference signs in parentheses are used to refer to the drawings and shall not be construed as affecting the scope of claims in any way.

(1) A vehicle drive device (1) includes: a speed change mechanism (3) that changes the speed of power from an engine and that transmits the power to a drive wheel; an oil pressure pump (19) that is driven by the engine; an accumulator (27) that accumulates oil pressure; and a control portion (304) that is allowed to execute a control mode that controls multiple hydraulic elements (e.g., the parking mechanism 28, the clutch C-3, the clutch B-2) to cause a vehicle in a stop state of the engine to start moving, in which the control mode starts controlling part (e.g., the parking mechanism 28) of the multiple hydraulic elements before the engine is started, by using the oil pressure accumulated in the accumulator, and the control mode starts controlling the rest (e.g., the clutch C-3, the brake B-2) of the multiple hydraulic elements by using oil pressure that is provided after the engine is started.

As such, primary oil pressure control is performed within the capacity of the accumulator, and secondary oil pressure control for the rest of the hydraulic elements is performed by using the oil pressure that is provided after the engine is started. This enables the vehicle to start moving smoothly. Further, this allows the accumulator to have a relatively small capacity.

(2) The control mode is a first control mode, the control portion (304) is allowed to execute a second control mode that controls fewer hydraulic elements than the multiple hydraulic elements controlled in the first control mode to cause the vehicle in the stop state of the engine to start moving, and the second control mode starts controlling all the hydraulic elements to be controlled, before the engine is started, by using the oil pressure from the accumulator (27).

(3) The control mode is a first control mode, the control portion (304) is allowed to execute a second control mode that controls one hydraulic element (e.g., the clutch C-1) to cause the vehicle in the stop state of the engine to start moving, and the second control mode starts controlling the hydraulic element (e.g., the clutch C-1) to be controlled, before the engine is started, by using the oil pressure from the accumulator (27).

This makes it possible to control each of the hydraulic elements to be controlled, before the engine is started, by using the oil pressure from the accumulator, thereby enabling the vehicle to start moving quickly and smoothly.

(4) The control portion (304) selectively executes the first and second control modes on the basis of a shift operation and/or a shift speed to be established.

This simple structure enables the vehicle in the idle-stop state to start moving smoothly.

(5) The control portion (304) compares the oil pressure of the accumulator (27) with a threshold value that is set corresponding to the hydraulic element that is controlled when the vehicle starts moving, when the oil pressure of the accumulator (27) is less than the threshold value, the control portion (304) executes the first control mode, and when the oil pressure of the accumulator (27) is greater than the threshold value, the control portion (304) executes the second control mode.

(6) The control portion (304) compares an amount of oil in the accumulator (27) with a threshold value that is set corresponding to the hydraulic element that is controlled when the vehicle starts moving, when the amount of oil in the accumulator (27) is less than the threshold value, the control portion (304) executes the first control mode, and when the amount of oil in the accumulator (27) is greater than the threshold value, the control portion (304) executes the second control mode.

This makes it possible to suitably selectively execute the first mode and the second mode on the basis of the oil pressure of the accumulator or the amount of oil in the accumulator (the accumulated pressure capacity).

(7) When the number of the hydraulic elements that are controlled to cause the vehicle to start moving is greater than a predetermined number, the control portion (304) executes the first control mode, and when the number is not greater than the predetermined number, the control portion (304) executes the second control mode.

This simple structure enables the vehicle in the idle-stop state to start moving smoothly.

(8) An oil-pressure actuated parking mechanism (28) is further included. When the parking mechanism (28) is included in the multiple hydraulic elements, the control portion (304) first performs control that releases a lock of the parking mechanism (28) by using the oil pressure from the accumulator (27).

This makes it possible to suitably selectively executes the first mode and the second mode on the basis of the oil pressure of the accumulator. Further, this enables the vehicle in the idle-stop state to start moving smoothly when a selector lever is manually shifted from P range to another range.

(9) The speed change mechanism (3) includes first and second engagement elements (e.g., the clutch C-3 and the brake B-2) that are engaged when the vehicle starts moving, and the maximum capacity of the accumulator (27) to accumulate oil is greater than the amount of oil needed to release the lock of the parking mechanism (28) and is less than the sum of the amount of oil needed to release the lock of the parking mechanism (28) and the amount of oil needed to engage the first and second engagement elements (e.g., the clutch C-3 and the brake B-2).

This allows the accumulator to release the lock of the parking mechanism and to have a compact structure.

(10) An oil-pressure actuated parking mechanism (28) is further included. The speed change mechanism (3) includes first and second engagement elements (e.g., the clutch C-3 and the brake B-2) that are engaged when the vehicle starts moving, and when the parking mechanism (28) and the first and second engagement elements (e.g., the clutch C-3 and the brake C-2) are included in the multiple hydraulic elements, the control portion (304) delays starting engagement control of the first and second engagement elements (e.g., the clutch C-3 and the brake C-2) until after the engine is started, on the basis of the fact that the oil pressure of the accumulator (27) or the amount of oil in the accumulator (27) after a lock of the parking mechanism (28) is released is less than a predetermined value.

This makes it possible to suitably selectively executes the first mode and the second mode on the basis of the internal pressure of the accumulator.

(11) The control portion (304) determines to start the engine on the basis of the fact that the rotational speed (Ne) of the engine reaches a predetermined rotational speed (N1).

This makes it possible for the control portion to control the hydraulic elements by using stable oil pressure from the oil pressure pump driven by the rotation of the engine that is equal to or faster than the predetermined rotational speed.

(12) A method of controlling a vehicle drive device to cause a vehicle in a stop state of an engine to start moving includes: a step (S20) of setting, on the basis of a shift operation and a shift speed to be established, at least one of hydraulic element that is controlled when the vehicle starts moving; a first oil pressure control step (S23) of controlling, out of the multiple hydraulic elements that are set to be controlled, part of the multiple hydraulic elements that is determined to be controlled by using oil pressure accumulated in an accumulator, by supplying the part of the multiple hydraulic elements with the oil pressure from the accumulator before the engine is started; and a second oil pressure control step (S28) of controlling the rest of the multiple hydraulic elements by supplying the rest of the multiple hydraulic elements with oil pressure after the engine is started.

Thus, primary oil pressure control is performed within the capacity of the accumulator, and secondary oil pressure control of the rest of the hydraulic elements is performed by using the oil pressure that is provided after the engine is started. This enables the vehicle to start moving smoothly. Further, this allows the accumulator to have a relatively small capacity.

Although preferred embodiments of the present invention are described above, the present embodiments are not limited to the specific embodiments, and various modifications, alterations, and combinations are possible without departing from the spirit of the present invention described in the claims.

This application claims the benefit of priority to Japanese Patent Application No. 2015-194000 filed on Sep. 30, 2015, the disclosure of which is incorporated herein by reference.

INDUSTRIAL APPLICABILITY

The present vehicle drive device is usable in vehicle drive devices to be mounted on vehicles, including passenger cars and trucks, and, in particular, is suitable for use in a vehicle drive device that performs vehicle start control by using oil pressure accumulated in an accumulator.

The invention claimed is:
1. A vehicle drive device comprising:
a speed change mechanism that changes a speed of power from an engine and that transmits the power to a drive wheel;
an oil pressure pump that is driven by the engine;
an accumulator that accumulates oil pressure; and
a control portion that is allowed to execute a control mode that controls a plurality of hydraulic elements to cause a vehicle in a stop state of the engine to start moving, wherein
the control mode starts controlling part of the plurality of hydraulic elements before the engine is started, by using the oil pressure accumulated in the accumulator, and
the control mode starts controlling a rest of the plurality of hydraulic elements by using oil pressure that is provided after the engine is started, wherein
the control mode is a first control mode,
the control portion is allowed to execute a second control mode that controls fewer hydraulic elements than the plurality of hydraulic elements controlled in the first control mode to cause the vehicle in the stop state of the engine to start moving, and
the second control mode starts controlling all the hydraulic elements to be controlled, before the engine is started, by using the oil pressure from the accumulator.

2. The vehicle drive device according to claim 1, wherein the control portion selectively executes the first and second control modes on the basis of a shift operation and/or a shift speed to be established.

3. The vehicle drive device according to claim 1, wherein the control portion compares the oil pressure of the accumulator with a threshold value that is set corresponding to the hydraulic element that is controlled when the vehicle starts moving,
when the oil pressure of the accumulator is less than the threshold value, the control portion executes the first control mode, and
when the oil pressure of the accumulator is greater than the threshold value, the control portion executes the second control mode.

4. The vehicle drive device according to claim 1, wherein the control portion compares an amount of oil in the accumulator with a threshold value that is set corresponding to the hydraulic element that is controlled when the vehicle starts moving,
when the amount of oil in the accumulator is less than the threshold value, the control portion executes the first control mode, and
when the amount of oil in the accumulator is greater than the threshold value, the control portion executes the second control mode.

5. The vehicle drive device according to claim 1, wherein when the number of the hydraulic elements that are controlled to cause the vehicle to start moving is greater than a predetermined number, the control portion executes the first control mode, and
when the number is not greater than the predetermined number, the control portion executes the second control mode.

6. The vehicle drive device according to claim 1, further comprising:
an oil-pressure actuated parking mechanism, wherein
the speed change mechanism includes first and second engagement elements that are engaged when the vehicle starts moving, and
when the parking mechanism and the first and second engagement elements are included in the plurality of hydraulic elements, the control portion delays starting engagement control of the first and second engagement elements until after the engine is started, on the basis of a fact that the oil pressure of the accumulator or an amount of oil in the accumulator after a lock of the parking mechanism is released is less than a predetermined value.

7. A vehicle drive device comprising:
a speed change mechanism that changes a speed of power from an engine and that transmits the power to a drive wheel;
an oil pressure pump that is driven by the engine;
an accumulator that accumulates oil pressure; and
a control portion that is allowed to execute a control mode that controls a plurality of hydraulic elements to cause a vehicle in a stop state of the engine to start moving, wherein
the control mode starts controlling part of the plurality of hydraulic elements before the engine is started, by using the oil pressure accumulated in the accumulator, and
the control mode starts controlling a rest of the plurality of hydraulic elements by using oil pressure that is provided after the engine is started, wherein
the control mode is a first control mode,
the control portion is allowed to execute a second control mode that controls one hydraulic element to cause the vehicle in the stop state of the engine to start moving, and
the second control mode starts controlling the hydraulic element to be controlled, before the engine is started, by using the oil pressure from the accumulator.

8. The vehicle drive device according to claim 7, wherein the control portion selectively executes the first and second control modes on the basis of a shift operation and/or a shift speed to be established.

9. The vehicle drive device according to claim 7, wherein the control portion compares the oil pressure of the accumulator with a threshold value that is set corresponding to the hydraulic element that is controlled when the vehicle starts moving,
when the oil pressure of the accumulator is less than the threshold value, the control portion executes the first control mode, and
when the oil pressure of the accumulator is greater than the threshold value, the control portion executes the second control mode.

10. The vehicle drive device according to claim 7, wherein
the control portion compares an amount of oil in the accumulator with a threshold value that is set corresponding to the hydraulic element that is controlled when the vehicle starts moving,
when the amount of oil in the accumulator is less than the threshold value, the control portion executes the first control mode, and
when the amount of oil in the accumulator is greater than the threshold value, the control portion executes the second control mode.

11. The vehicle drive device according to claim 7, wherein when the number of the hydraulic elements that are controlled to cause the vehicle to start moving is greater than a predetermined number, the control portion executes the first control mode, and
when the number is not greater than the predetermined number, the control portion executes the second control mode.

12. The vehicle drive device according to claim 7, further comprising:
an oil-pressure actuated parking mechanism, wherein
the speed change mechanism includes first and second engagement elements that are engaged when the vehicle starts moving, and
when the parking mechanism and the first and second engagement elements are included in the plurality of hydraulic elements, the control portion delays starting engagement control of the first and second engagement elements until after the engine is started, on the basis of a fact that the oil pressure of the accumulator or an amount of oil in the accumulator after a lock of the parking mechanism is released is less than a predetermined value.

13. A vehicle drive device comprising:
a speed change mechanism that changes a speed of power from an engine and that transmits the power to a drive wheel;
an oil pressure pump that is driven by the engine;
an accumulator that accumulates oil pressure;
a control portion that is allowed to execute a control mode that controls a plurality of hydraulic elements to cause a vehicle in a stop state of the engine to start moving; and
an oil-pressure actuated parking mechanism, wherein
the control mode starts controlling part of the plurality of hydraulic elements before the engine is started, by using the oil pressure accumulated in the accumulator,
the control mode starts controlling a rest of the plurality of hydraulic elements by using oil pressure that is provided after the engine is started, and
when the parking mechanism is included in the plurality of hydraulic elements, the control portion first performs control that releases a lock of the parking mechanism by using the oil pressure from the accumulator.

14. The vehicle drive device according to claim 13, wherein
the speed change mechanism includes first and second engagement elements that are engaged when the vehicle starts moving, and
a maximum capacity of the accumulator to accumulate oil is greater than an amount of oil needed to release the lock of the parking mechanism and is less than a sum of the amount of oil needed to release the lock of the parking mechanism and an amount of oil needed to engage the first and second engagement elements.

15. A vehicle drive device comprising:
a speed change mechanism that changes a speed of power from an engine and that transmits the power to a drive wheel;
an oil pressure pump that is driven by the engine;
an accumulator that accumulates oil pressure; and
a control portion that is allowed to execute a control mode that controls a plurality of hydraulic elements to cause a vehicle in a stop state of the engine to start moving, wherein
the control mode starts controlling part of the plurality of hydraulic elements before the engine is started, by using the oil pressure accumulated in the accumulator,
the control mode starts controlling a rest of the plurality of hydraulic elements by using oil pressure that is provided after the engine is started, and
the control portion determines to start the engine on the basis of a fact that a rotational speed of the engine reaches a predetermined rotational speed.

* * * * *